United States Patent [19]

Dalin et al.

[11] Patent Number: 5,154,906
[45] Date of Patent: Oct. 13, 1992

[54] REDOX-POTENTIAL CONTROL FOR HYDROGEN PEROXIDE IN NITRIC ACID

[75] Inventors: Ivan Dalin, Kungälv; Troy Berglind, Nol, both of Sweden

[73] Assignee: Eka Nobel AB, Bohus, Sweden

[21] Appl. No.: 639,544

[22] Filed: Jan. 10, 1991

[30] Foreign Application Priority Data

Jan. 17, 1990 [SE] Sweden .................. 9000166

[51] Int. Cl.$^5$ ............ C01B 21/38; C01B 21/40; C01B 21/24; C01B 21/00
[52] U.S. Cl. .................. 423/390; 423/235; 423/393; 423/400
[58] Field of Search .......... 423/390, 393, 400, 235 R

[56] References Cited

U.S. PATENT DOCUMENTS 4,938,838  7/1990  Dalin et al. .............. 423/390

FOREIGN PATENT DOCUMENTS

| 0008488 | 5/1980 | European Pat. Off. |
| 267166 | 11/1988 | European Pat. Off. |
| WO89/00449 | 1/1989 | European Pat. Off. |
| 1280412 | 7/1972 | United Kingdom |
| 2000196 | 2/1980 | United Kingdom |
| 2027004 | 2/1980 | United Kingdom |

OTHER PUBLICATIONS

Ullman, "Encyklopadie der Technischen Chemie", 4th edition, vol. 3, pp. 261–262; vol. 5, pp. 926–929.
W. Sturm, "Reinigung NOx-haltiger Abluft mit verwendbarem Endproduckt", Chimie-Technik, 11, Jahrgang (1982), No. 9, pp. 1013–1014.

*Primary Examiner*—Gregory A. Heller
*Attorney, Agent, or Firm*—Burns, Doane, Swecker & Mathis

[57] ABSTRACT

A method of maintaining a given content of a substance A in an aqueous solution where it is continuously consumed and where the redox potential E, at least within the range of concentration used, approximately satisfies the equation:

$$E = G + F(x)$$

wherein x is the content of A, F is a function of x whose derivative dF/dx approaches zero when x assumes a high value, and G on the whole is independent of x but is influenced by other parameters, such as pH, temperature or the like. The addition of A is controlled in such manner that a set value of the redox potential is maintained. The set value is determined by increasing or decreasing the addition of A in a predetermined manner, whereupon the redox potential is measured, and the measured value is used for determining the set value.

5 Claims, 2 Drawing Sheets

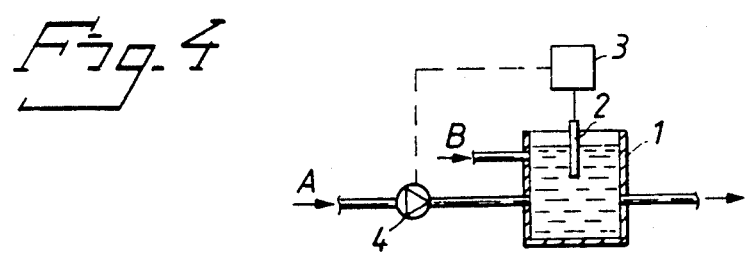
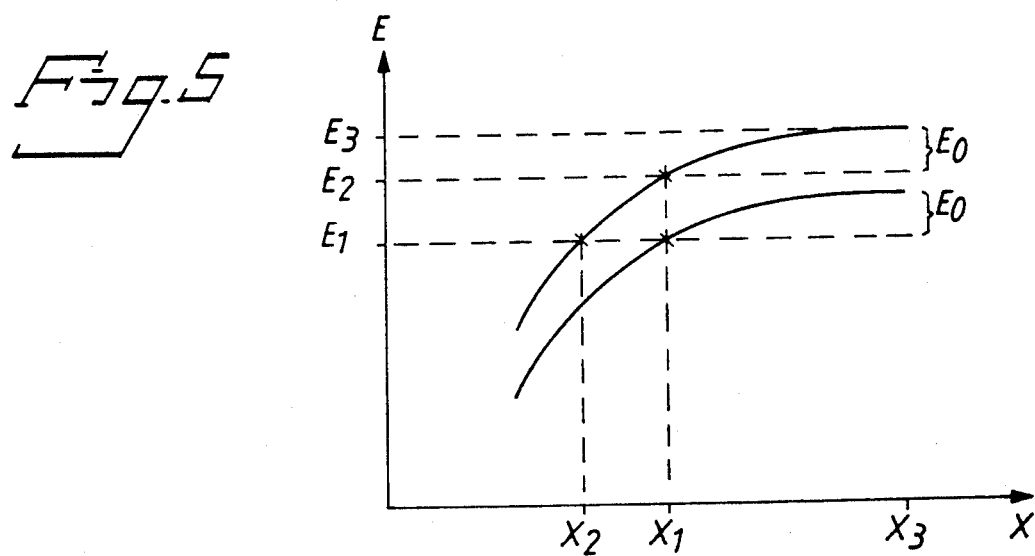
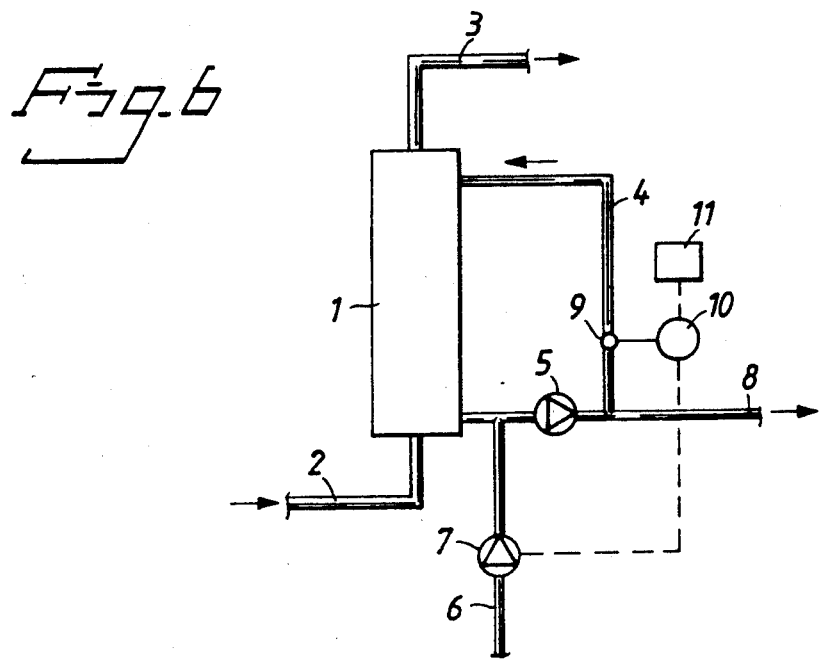

REDOX-POTENTIAL CONTROL FOR HYDROGEN PEROXIDE IN NITRIC ACID

BACKGROUND OF THE INVENTION

The present invention relates to a method of maintaining a given content of a substance in an aqueous solution where it is continuously consumed and where the redox potential is a function of the concentration of this substance. The substance is added in such manner that a set value of the redox potential is maintained.

It is common knowledge to utilise for analyses and in examining the course of chemical reactions measuring of the redox potential in aqueous solutions (see, for instance, Ullman, "Encyklopädie der technischen Chemie", 4th Edition, Vol. 3, pp 261-262; Vol. 5, pp. 926-929). In most cases, the potential between an inert electrode, e.g. platinum, and a reference electrode, e.g. calomel (Hg, $Hg_2Cl_2$, KCl) or silver/silver chloride, is measured. The redox potential in an aqueous solution is a measure of the ability of the components to oxidise or reduce relative to the reference electrode. Thus, the measured potential is dependent on the concentrations of the oxidising or reducing substances in the solution, and the interrelations generally are logarithmic. It has been found that, mostly, the interrelation of the redox potential E and the content x of an oxidising or reducing agent approximately satisfies the following equation:

$$E = G + F(x) \qquad (I)$$

F(x) is a function that in most cases can be written as $T \cdot k \cdot \ln x$, wherein k is a constant and T is the absolute temperature. Thus, the derivative dF/dx will be $T \cdot k/x$, the value of which asymptotically approaches 0 when x assumes a high value. G is independent of x but is influenced by other parameters, such as temperature and the contents of other components. Mostly, G is influenced considerably by the pH of the solution.

FIG. 1 illustrates the redox potential as a function of the content of hydrogen peroxide in 20% nitric acid, FIG. 2 illustrates the redox potential as a function of the content of hypochlorite ions in water at pH 10, and FIG. 3 illustrates the redox potential as a function of the content of sodium sulphite at pH 9.5. In all cases, use was made of a platinum electrode and a silver/silver chloride electrode for the measuring. As shown in the Figures, the curves level out at high contents. There are also a large number of other systems with similar redox curves, e.g. chromic acid, permanganate in acid solution, and hydrazine at high pH values.

Since the redox curves are influenced by many factors other than the concentrations that it is of essence to control, redox measuring is, in practice, not much used for process control. Although it is theoretically possible to compensate for changes in temperature and pH, it is in practice often difficult to execute correct pH measurings, especially in particle-containing solutions, or in extremely acid or alkaline solutions. Furthermore, the measuring electrodes used change in course of time, e.g. by the formation of coatings, which also affects the measured value.

GB, A, 1,280,412 discloses redox control in the regeneration of copper chloride solutions for etching. However, the shifts of the redox curves are not touched upon in this patent.

EP, A2, 267,166 discloses a method for controlling the addition of hydrogen peroxide to a solution of nitric acid in such manner that a set value of the redox potential is maintained. In the solution, the hydrogen peroxide is consumed by $HNO_2$ being oxidised to $HNO_3$, thus preventing the emission of nitrous gases. The addition of hydrogen peroxide is adjusted in such manner that the emission of $NO_x$, i.e. NO and $NO_2$, will be as low as possible, without excessive consumption of hydrogen peroxide. The redox system is characterised in that the redox potential curve shows a very distinct maximum when the hydrogen peroxide content is zero, which is used in the control. Since the curve is very steep at the maximum, uncertainty as to the redox potential only causes a negligible error in the hydrogen peroxide content. Thus, curve shifts depending on pH, temperature or the like are no major problem. The technique described in this patent functions satisfactorily in many cases, e.g. in the treatment of pickling baths in the metal industry. However, this patent provides no method for adjusting and maintaining for some time a constant hydrogen peroxide content in an aqueous solution, outside the steep section of the redox curve, where an insignificant error in the redox potential causes a considerable error in the concentration.

SUMMARY OF THE INVENTION

The present invention is based on the insight that different curves for different constant values of G become parallel in systems which satisfy the above equation (I). Thus, the derivative dE/dx is independent of the value of G. In many cases, the factors which affect the concentration x vary much faster than the conditions affecting G. In the short run, G may therefore often be regarded as a constant, and it is thus sufficient to continuously control the content x. In course of time, however, G changes, and the redox curve is shifted in parallel upwards or downwards. Thus, an erroneous concentration x will be adjusted if the set value is not altered. Up to now, it has been impossible to do this in a simple and reliable manner.

The present invention aims at obviating the above inconveniences by providing a method of maintaining a given content of a substance in an aqueous solution, as stated in claim 1. More specifically the invention concerns a method of maintaining a given content of a substance A in an aqueous solution where it is continuously consumed and where the redox potential E, at least within the range of concentration used, approximately satisfies the equation:

$$E = G + F(x)$$

wherein x is the content of A, F is a function of x whose derivative dF/dx approaches zero when x assumes a high value, and G on the whole is independent of x but is influenced by other parameters, such as pH, temperature or the like. The addition of A is controlled in such manner that a set value of the redox potential is maintained. The set value is determined by increasing or decreasing the addition of A in a predetermined manner, whereupon the redox potential is measured, and the measured value is used for determining the set value. A

BRIEF DESCRIPTION OF THE DRAWINGS

For a fuller understanding of the invention, the following detailed description should be read in conjunction with the drawings, wherein:

FIG. 4 illustrates a continuous process in which the concentration of a reactant is monitored;

FIG. 5 is a series of graphs of redox potential as a function of concentration of reactant x; and FIG. 6 is a schematic illustration of a preferred embodiment of the invention.

DETAILED DESCRIPTION OF THE PREFERRED EMBODIMENTS

Figure 1:
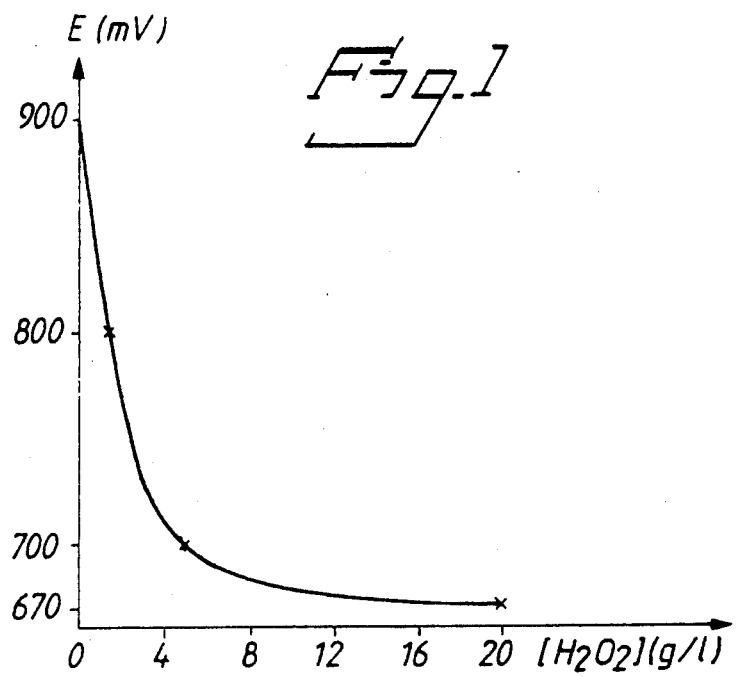
FIG. 1 is a graph of redox potential as a function of the content of hydrogen peroxide.
Figure 2:
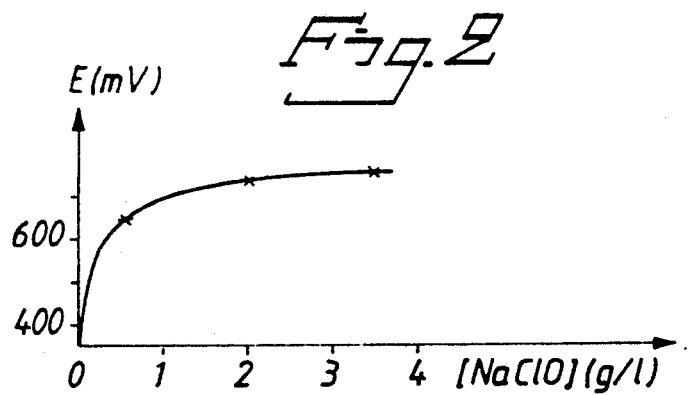
FIG. 2 is a graph of redox potential as a function of the content of hypochlorite ions.

FIGS. 4 and 5 illustrate the principle upon which the invention is based. FIG. 4 shows a basic diagram for a continuous process in which a substance A has a concentration x in an aqueous solution in a container 1. The redox potential E of the solution is dependent on x in accordance with the curves in FIG. 5, which at least within the concentration range used approximately satisfy the equation (I), wherein F is a function whose derivative $dF/dx$ approaches zero when x assumes a high value. The curves in FIG. 5 relate to different values of G which on the whole is independent of x but is influenced by other parameters, such as pH, temperature, and aging of the measuring electrode. However, a prerequisite of the invention is that the curves are substantially parallel within the concentration range used, as is the case if the above conditions are fulfilled. In the solution, A reacts with another substance B, the influx of which is not constant. It is undesirable that the outflow contains any amount of B, and the consumption of A should be minimised. This is achieved if the content x is maintained constant at $x_l$ by adjusting the supply of A in such manner that a suitable set value $E_l$ of the redox potential is maintained. This is easily achieved by means of a potentiometer 2 which is connected to a known controller 3, e.g. a PID controller, controlling an adjustable pump 4 or a regulating valve (not shown). In the beginning, the redox function follows the lower curve. After a certain period of time, however, conditions have changed, causing G to assume another value, and causing the redox function to agree with the upper curve. Since the controller still serves to maintain the set value $E_l$, the concentration x will erroneously be adjusted to $x_2$, which is too low a content to make all B react. If the process is to function as intended, the set value must therefore be altered to $E_2$, by the method described above.

However, it should be pointed out that the invention is by no means restricted to chemical processes of the above type. Thus, A can be consumed otherwise than by reacting chemically with another substance. It is conceivable that A decomposes spontaneously, e.g. by a catalytic process, or that it undergoes a physical process. Moreover, the factors controlling the variations in the consumption of A are optional. What matters is that A is consumed, and that the concentration thereof affects the redox potential of the solution in accordance with the interrelations stated above. However, the system must not be too slow. Further, it is not necessary that the interrelations are exact; the invention is applicable as long as the deviations are so low that the process is not too much affected by the minor control errors which arise. The invention is especially advantageous in oxidation or reduction processes where comparatively high contents of the oxidising or reducing agent must be maintained in an aqueous solution.

The set value can be adjusted in the manner described when it is necessary, i.e. when the process no longer functions optimally, which, for instance, can be shown by analysing outgoing product flows. In many cases, however, it is perfectly sufficient that the control of the set value is carried out on a scheduled basis, e.g. every 30 minutes, once every hour or once every other hour, depending on the process stability. It is also conceivable to use irregular schedules taking into account external circumstances.

Each time the set value is to be determined, the addition of A is increased or decreased in a predetermined manner, whereupon the redox potential is measured, and the measured value is used for determining the set value. Preferably the redox-potential measuring and the predetermined increase or decrease of the addition of A is done in a limited amount of the solution, e.g. in a circulating flow measuring circuit.

Figure 3:
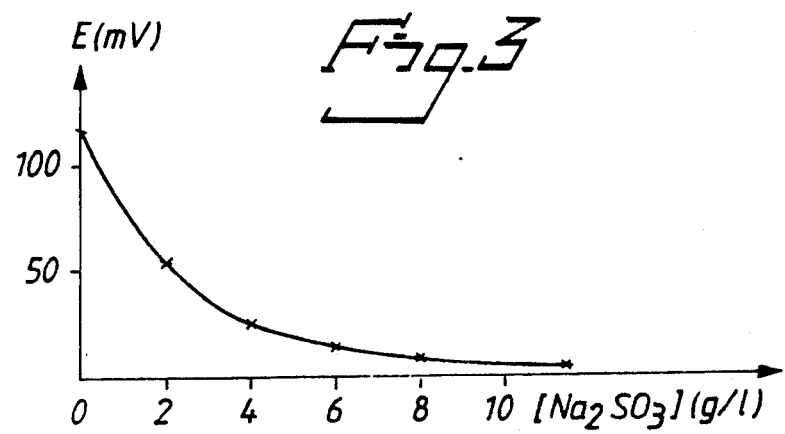
FIG. 3 is a graph of a redox potential as a function of the content of sodium sulphite.

A preferred way of determining the set value is to add a predetermined excess of substance A in addition to the continuous supply controlled by the redox control, i.e. a predetermined temporary increase of the addition. Thus, each time the set value is to be determined, the alteration of the addition of A is made in the form of a predetermined temporary increase sufficient to ensure that the derivative $dE/dx$ of the redox potential function, at the content prevailing immediately after the addition, has a value comparatively close to zero, whereupon the redox potential is measured, and a known value is added to or subtracted from the measured value to form the set value. Referring to the curves in FIG. 5, the excess added should be such that the content of A is at least $x_3$ immediately after the addition, which corresponds to the redox potential $E_3$. The new set value is determined on the basis of the measured potential by the subtraction $E_3 - E_0 = E_2$. The correction constant $E_0$ is identical for all curves with different G values and is known if the curve is known for at least one G value. To experimentally determine a redox curve is an easy matter for anyone skilled in the art. $E_0$ may be regarded as the difference between the redox potential when there is a considerable excess of A, and the potential prevalent at the concentration which is the desired process operating point. If the curve is reversed, as in FIGS. 1 and 3, the correction constant should instead be added. Since the curve is comparatively flat at $x_3$, i.e. the derivative $dE/dx$ is comparatively close to zero, uncertainty as to the concentration causes an error of the adjusted set value, which error however is so insignificant that it can be disregarded for most applications of process engineering. The excess addition should be sufficient to ensure that the derivative $dE/dx$ at the content prevailing immediately after the addition has a value comparatively close to zero. The suitable size of the addition depends on the flatness of the curve in the concentration range at issue and on the size of the allowable variations of the content of A. A large excess addition gives a more exact set value, but also a higher consumption of A. However, it is possible to reduce this consumption when determining the set value by measuring the potential in a limited amount of the solution, such as in a circulating flow measuring circuit. In that case, the excess additions need only be supplied to the measuring circuit, e.g. by means of a separate dosing pump. This method is also advantageous in processes sensitive to an excess of A. Suitably, the size of the increase of the addition required for giving a specific concentration is determined experimentally in the process at issue. The above method for determining the set value is extremely simple to carry out, by hand as well as with the aid of a known process computer.

Another preferred way of determining the set value is to utilise the fact that the derivative of the redox function is constant at a given content and essentially independent of other conditions, i.e. the G value. Thus, the adjustment is carried out by increasing or decreasing the addition of A by a predetermined amount, preferably increasing and preferably during a given period of time, whereupon the quotient between the alteration of the measured potential and the alteration of the addition of A is determined. This quotient is a good approximation of a value which is proportional to the derivative of the function at the point in question. The quotient is compared with a known value and the determination of the set value is based on this comparison. In other words, the value of the quotient is compared with the corresponding, presupposedly known quotient at the content of A which it is desirable to maintain. The desirable value of the quotient for a given process is easily determined experimentally by executing the predetermined alteration of the addition at a time when the content of A is as desired, which will be illustrated in Example 2. On the basis of the comparison, the set value is increased or decreased, whereupon the procedure is repeated until a predetermined value of the quotient has been obtained, i.e. the measured quotient corresponds to the desired one. Thus, also in this embodiment, the set value is determined by using a value of the redox potential which is measured after a predetermined alteration of the addition of A. This alteration should be sufficient and the time be short enough so that the estimate of the derivative is not influenced too much by the fact that A is continuously consumed in the solution. However, the time must not be too short since this may result in too large concentration gradients in the solution, which makes careful potential measuring more difficult. If the alteration is too considerable, the estimate of the derivative is not sufficiently accurate, especially if the curve shows a steep bend. In order to reduce the effect of the consumption of A, it is generally preferred to increase, not decrease, the addition of A. It is also possible to reduce the alterations of the increases when these are repeated, to obtain a more exact value of the derivative at the final determination. Also this method can be carried out by hand, although it is preferred using a process computer. Compared with the embodiment described above, it is advantageous that the redox curve need not be that flat to enable a correct set value to be determined; it is sufficient that the derivative $dE/dx$ of the function is decreasing or increasing when x increases, and that the derivative $dG/dx$ is 0 or a constant. Furthermore, the method is advantageous in processes where too high concentrations of A involve practical inconveniences, such as violent reactions, precipitations or the like.

Compared with prior art technique, both embodiments of the invention are highly advantageous since they make it possible to carefully control concentrations within wide ranges without requiring any expensive equipment for accurate measuring and control of a large number of parameters, such as pH, temperature, or aging of measuring electrodes, since the corrections of the set value become correct, regardless of the reason for altering the operating conditions. Specifically, the invention is particularly advantageous in a process of keeping the content of hydrogen peroxide constant in a solution of nitric acid, especially if the solution containing nitric acid and hydrogen peroxide is used for absorbing $NO_x$ from a gas mixture.

To further illustrate the invention, an application will be described below in which the inventive method is used for controlling a process for eliminating nitric oxides from a gas flow. Processes for absorbing $NO_x$ (NO and $NO_2$) in nitric acid containing hydrogen peroxide are known from e.g. EP, Al·8488 which, however, does not state how the hydrogen peroxide content is controlled, which is desirable in order to minimise the through-flow of $NO_x$ without excessive consumption of the comparatively expensive hydrogen peroxide. Up to now, this has been difficult to achieve, especially if the content of $NO_x$ varies substantially in the gas flow.

W. Sturm, "Reinigung $NO_x$-haltiger Abluft mit verwendbarem Endprodukt", Chemie-Technik, 11. Jahrgang (1982), No. 9, pp 1013–1014 discloses an absorption process using potassium permanganate as indicator for keeping the hydrogen peroxide content at a suitable level. However, the liquid from the measuring vessel cannot be recycled to the scrubber, and there is also a risk that $MnO_2$ will be precipitated. Also, the inconveniences associated with the shifts of the redox curves are not touched upon.

A preferred inventive process for absorbing $NO_x$— will be described below, reference being made to FIG. 6 which shows a scrubber 1 with an inlet 2 for gas containing $NO_x$, and an outlet 3 for purified gas. Through the scrubber 1 and a conduit 4 with a circulating pump 5 circulates a solution containing 0.1–55% by weight of nitric acid, suitably 1–40% by weight, preferably 5–30% by weight, and 0.1–200 g/l of hydrogen peroxide, suitably 0.5–40 g/l, preferably 2–10 g/l. If the hydrogen peroxide content is too low, this impairs the $NO_x$ absorption. Too high a content does no real harm, but it does not improve the purification either. Hydrogen peroxide is supplied through a conduit 6 and a pump 7 while nitric acid is drained through a conduit 8. A potentiometer 9 measures the redox potential in the circulating solution, optionally via a measuring circuit where a part flow of the nitric acid circulates. An additional dosing pump for hydrogen peroxide can be connected to the measuring circuit to be used when determining the set value. The measured redox potential value is processed by a controller 10, which controls the hydrogen peroxide pump 7, in such manner that a set value of the redox potential is maintained. Alternatively, the controller may cooperate with a regulating valve for controlling the hydrogen peroxide influx. Suitably, the controller is of PID-type and is capable of controlling the redox potential in such manner that the latter differs no more than 2–3 mV from the set value. A process computer 11 cooperates with the controller 10 and is programmed to adjust the set value in accordance with any of the embodiments described above. With this method, it is possible to treat $NO_x$-containing gas flows within a wide concentration range, and the limits are set by the economic conditions.

The following Examples illustrate how the above application functions in actual practice. However, it should be pointed out that the invention is by no means restricted to controlling the hydrogen peroxide concentration in nitric acid, but can be applied to all systems where there is an approximative connection between the redox potential and the content of a substance in accordance with the equation (I) mentioned in the introduction to this specification, as stated in claim 1. In the Examples, all the contents are given in % by weight, unless otherwise indicated.

EXAMPLE 1:

Absorption of $NO_x$ in nitric acid and hydrogen peroxide was carried out in a plant of the type described with reference to FIG. 5. The absorption tower had a diameter of 1 m and a height of 7 m, and was packed with turnings of stainless steel. The system contained 700 l of 20% nitric acid to which 35% hydrogen peroxide was continuously supplied and which circulated at a flow rate of 12 m$^3$/h at a temperature of about 20° C. The gas flow was 1440 Nm$^3$/h and had a constant $NO_x$ content of 2000 ppm, the molar ratio $NO/NO_2$ being 3/2. Three tests were made in which the addition of hydrogen peroxide was varied.

| Test | Consumption $H_2O_2$ (1/h) | Content $H_2O_2$ (g/l) | Outgoing $NO_x$ content (ppm) | Degree of purification of $NO_x$ (%) |
|---|---|---|---|---|
| 1.1 | 9.5 | 3 | 550 | 75 |
| 1.2 | 11 | 5 | 300 | 85 |
| 1.3 | 14 | 10 | 270 | 87 |

As shown in the tests, about 5 g/l of hydrogen peroxide is required in the circulating solution to obtain a degree of purification exceeding 80%, which in most cases is desirable. According to the redox curve in FIG. 1, this content in 20% nitric acid corresponds to a redox potential of about 700 mV. Contents exceeding 20 g/l correspond to a potential of about 670 mV, the change in potential being insignificant at higher contents. When the set value is determined in accordance with the first preferred embodiment, the predetermined temporary increase of the addition of hydrogen peroxide should be sufficient to give a content exceeding 20 g/l. Thus, the correction constant $E_0$ becomes 700−670=30 mV. The requisite size of the increase can be determined experimentally. In the process described, it has been found suitable to increase the influx by 40 l/h for 30 seconds. How the set value is determined in actual practice will be illustrated in Example 3 below.

EXAMPLE 2:

The procedure of Example 1 was repeated, except for an automatic control of the hydrogen peroxide addition maintaining a set value for the redox potential of 700 mV in the circulating solution. The temperature in the solution was 20° C.-30° C. The gas flow was 1440±200 Nm$^3$/h, and the $NO_x$ content varied all the time between 2400 ppm and 6500 ppm. The molar ratio $NO/NO_2$ varied from 3/2 to 1/1. When steady-state condition had been reached (about 30 min.), the consumption of hydrogen peroxide was about 11 l/h, and the hydrogen peroxide content in the solution was 5 g/l. At this point, the hydrogen peroxide addition was temporarily increased by 2 l/h for 35 seconds, at which the redox potential fell to 692 mV. Thus, the quotient between the decrease in the redox potential and the increase of the hydrogen peroxide addition was 4 mVh/l, which is a good approximation of a value proportional to the derivative dE/dx at a hydrogen peroxide content of 5 g/l. This value constitutes the known quotient used when determining the set value in accordance with the second preferred embodiment, as illustrated in Example 4.

EXAMPLE 3:

The test in Example 2 was continued with the same liquid and gas flows. The controller set the redox potential at 700 mV. After an hour, samples were taken of the circulating acid which was found to contain 24% nitric acid and 8 g hydrogen peroxide/litre. The higher acidity had resulted in that the potential 700 mV corresponded to 8 g hydrogen peroxide/litre, for which reason excessive amounts were consumed. The hydrogen peroxide dosing was increased to 40 l/h for 30 seconds, which empirically gives a concentration exceeding 20 g/l in the circulating solution. The redox potential was measured and found to be 682 mV, to which was added the known $E_0$ value (see FIG. 1), i.e. 30 mV. Thus, the new set value was adjusted to 682+30=712 mV. When this value had been reached, the hydrogen peroxide proved to be about 5 g/l. With the aid of the process computer, adjustment of the set value was repeated every 30 minutes, and the hydrogen peroxide content was al the time kept close to 5 g/l. The average degree of purification of $NO_x$ was about 80%.

EXAMPLE 4:

The test of Example 3 was continued with the same liquid and gas flows. At one point, the set value was 720 mV when the hydrogen peroxide content was 5 g/l. An hour later, the set value was altered in the following manner with the aid of the process computer. The hydrogen peroxide addition was increased by 2 l/h for 15 seconds, at which the redox potential fell by 6 mV to 714 mV. Thus, the quotient between the decrease in the redox potential and the increase of the hydrogen peroxide addition was 3 mVh/l, for which reason the set value was raised to 2 mV. This procedure was repeated until the quotient was 4 mVh/l which, according to Example 2, is the known value of the quotient at a hydrogen peroxide content of 5 g/l. If the quotient turned out to be above 4, the set value was lowered by 2 mV, and if the quotient was below 4, the set value was raised by 2 mV. Thus, a hydrogen peroxide content of about 5 g/l was maintained, and the average degree of purification of $NO_x$ was about 80%.

We claim:

1. A method of maintaining a given content of hydrogen peroxide in an aqueous solution of nitric acid, wherein the hydrogen peroxide is continuously consumed by absorption of a gas mixture containing $NO_x$, and where the redox potential E, at least within the range of concentration used, approximately satisfies the equation:

$$E = G + F(x)$$

wherein x is the concentration of hydrogen peroxide in the solution, F is a function of x wherein the derivative dF/dx approaches zero when x assumes a high value and G is a parameter substantially independent of x but whose value varies as a function of other parameters, the method comprising the steps of:
   (a) increasing the rate of addition of hydrogen peroxide to thereby increase the concentration of hydrogen peroxide in the aqueous solution to a level such that the derivative dE/dx of the redox potential function has a value of approximately zero;
   (b) measuring the redox potential when said derivative has a value of approximately zero;

(c) calculating a redox potential set value from the redox potential measured value from step (b) by adding or subtracting a known value $E_o$ from the redox potential value measured in step (b);

(d) adjusting the rate of addition of hydrogen peroxide to said aqueous solution such that the adjusted value results in a redox potential corresponding to the set value, thereby maintaining the given content of hydrogen peroxide in the aqueous solution; and (e) repeating steps (a), (b), (c) and (d) on a periodic basis.

2. A method as claimed in claim 1, wherein the steps (a), (b), (c) and (d) are repeated on a scheduled basis.

3. A method as claimed in claim 1, wherein steps (a) and (b) are performed in a limited amount of said aqueous solution.

4. A method of maintaining a given content of hydrogen peroxide in an aqueous solution of nitric acid, wherein the hydrogen peroxide is continuously consumed by absorption of a gas mixture containing $NO_x$, and where the redox potential E, at least within the range of concentration used, approximately satisfies the equation:

$$E = G + F(x)$$

wherein x is the concentration of hydrogen peroxide in the solution, F is a function of x and G is a parameter substantially independent of x but whose value varies as a function of other parameters, the method comprising the steps of:

(a) measuring the redox potential in the aqueous solution at an initial rate of addition of A to the solution;

(b) altering the rate of addition of hydrogen peroxide by a predetermined amount and measuring the redox potential in the aqueous solution at the altered rate of addition of hydrogen peroxide;

(c) calculating a quotient of $\Delta E/(\Delta\text{rate of addition})$ based on the difference in the measured redox values E and the known initial and altered rates of addition of hydrogen peroxide from step (a) and step (b), wherein the quotient $\Delta E/(\Delta \text{ rate of addition})$ approximately corresponds to the derivative $dE/dx$ at said given rate of addition of hydrogen peroxide in step (a);

(d) determining the concentration of hydrogen peroxide corresponding to the value of the derivative $dE/dx$ obtained from step (c) by reference to a known curve of E vs. x, and comparing said determined concentration of hydrogen peroxide with a desired concentration;

(e) calculating a redox potential set value corresponding to said desired concentration of hydrogen peroxide by reference to said known curve of E vs. x, and adjusting the rate of addition of hydrogen peroxide until said set value is obtained; and (f) repeating steps (a), (b), (c), (d) and (e) on a periodic basis.

5. A method as claimed in claim 4, wherein the predetermined amount of alteration of hydrogen peroxide addition in step (b) is obtained by a predetermined increase of flow rate of hydrogen peroxide to said aqueous solution during a given period of time.

* * * * *